Patented Apr. 1, 1924.

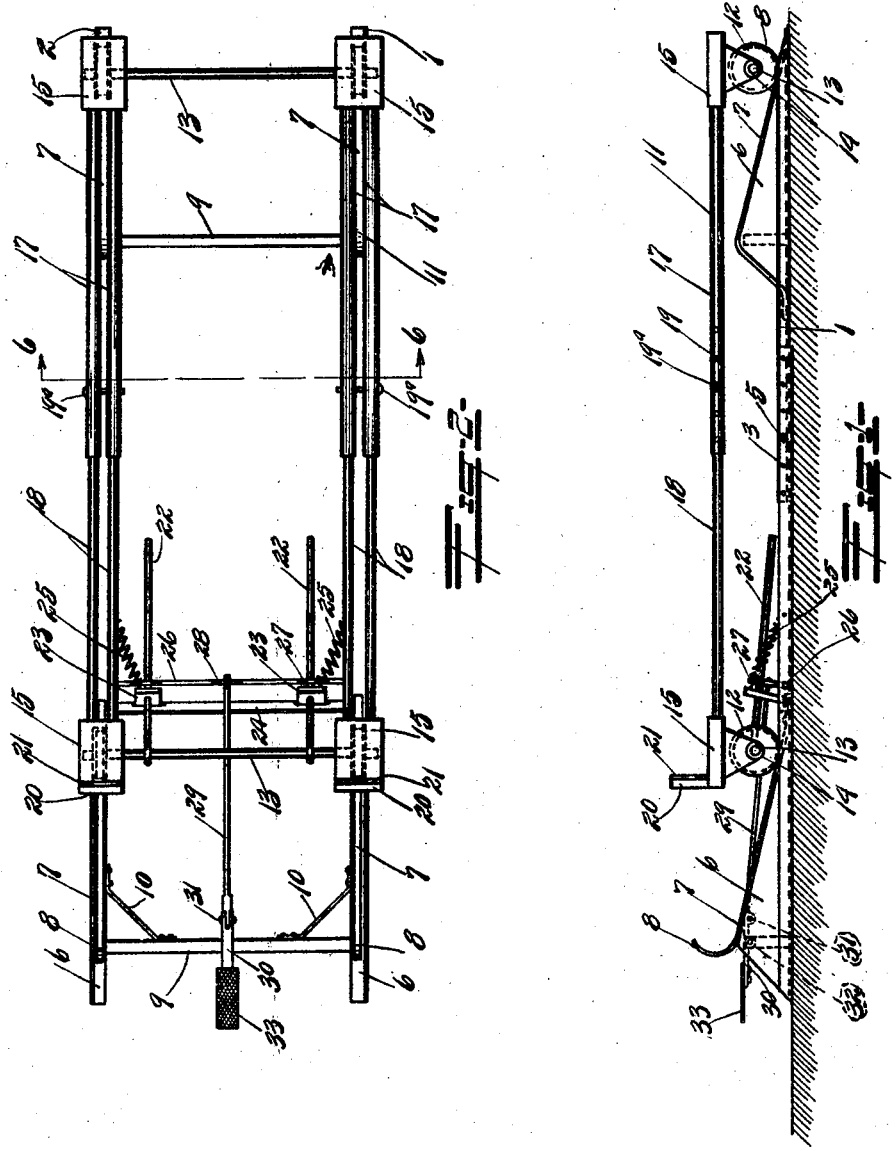

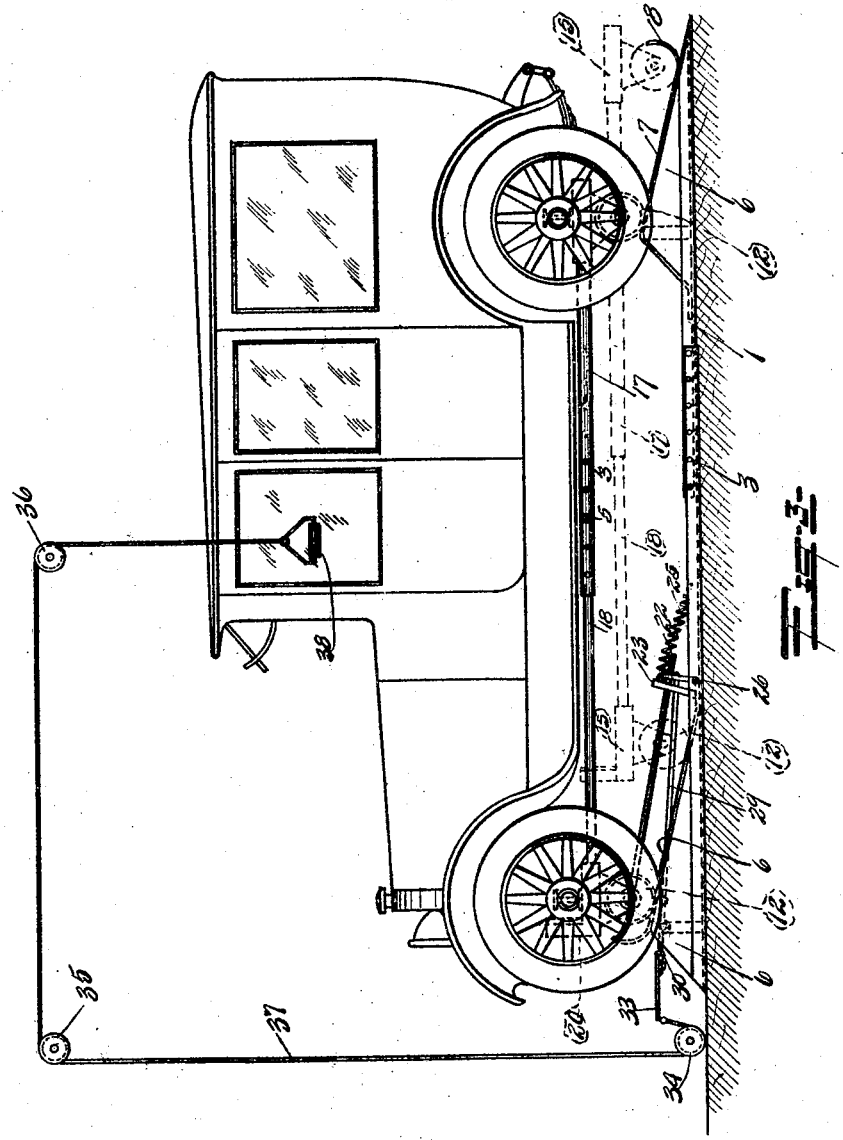

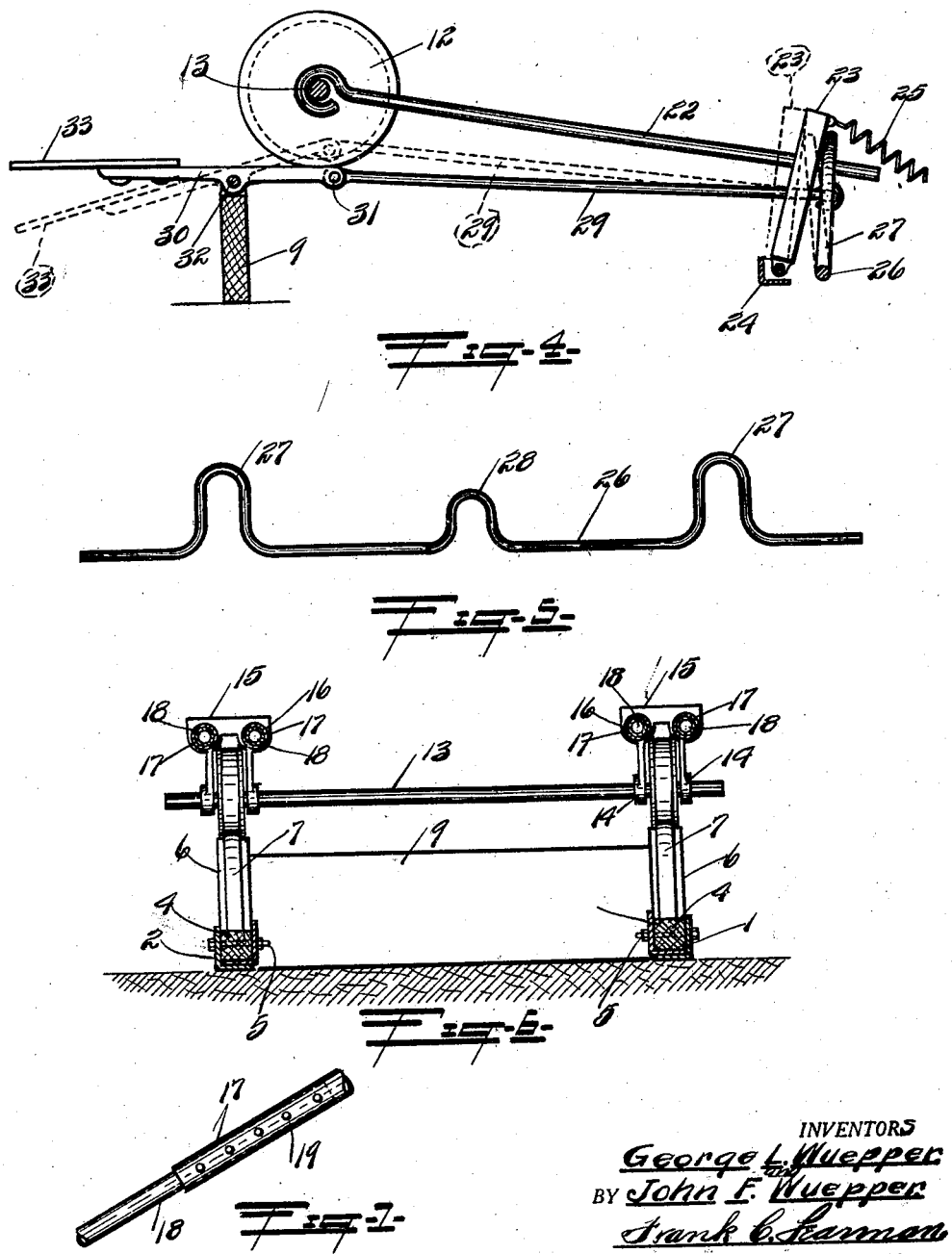

1,488,524

UNITED STATES PATENT OFFICE.

GEORGE L. WUEPPER AND JOHN F. WUEPPER, OF BAY CITY, MICHIGAN.

VEHICLE RAISING MECHANISM.

Application filed May 17, 1922. Serial No. 561,722.

*To all whom it may concern:*

Be it known that we, GEORGE L. WUEPPER and JOHN F. WUEPPER, citizens of the United States of America, and residents of Bay City, in the county of Bay and State of Michigan, have invented certain new and useful Improvements in Vehicle Raising Mechanisms, of which the following is a specification.

This invention relates to vehicle raising mechanism and the like and particularly to a mechanism whereby the entire vehicle can be automatically raised clear of the ground or floor.

One object of the invention is to provide a simple, practical and durable raising mechanism which will automatically raise the vehicle any desired distance from the ground.

Another object is to provide a simple raising mechanism which can be placed on the floor of a garage, and which will automatically engage and raise the vehicle as it is driven into the structure, the raise being governed by the momentum of the vehicle.

A still further object is to provide means whereby the vehicle can be automatically released by the driver while seated in the driver's seat in the vehicle.

With the above and other objects in view, the present invention consists in the combination and arrangement of parts, hereinafter more fully described, illustrated in the accompanying drawings and particularly pointed out in the appended claims, it being understood that changes may be made in the form, size, proportion and minor details of construction without departing from the spirit or sacrificing any of the advantages of the invention.

In the drawings:—

Fig. 1 is a side view of our vehicle raising mechanism.

Fig. 2 is a top plan view thereof.

Fig. 3 is a view similar to Fig. 1 illustrating a conventional motor vehicle in place thereon, the raising means being shown in two different positions.

Fig. 4 is an enlarged fragmentary view of the holding and releasing mechanism.

Fig. 5 is an enlarged detail view of the rod for actuating the stop.

Fig. 6 is an enlarged transverse sectional view taken on the line 6—6 of Fig. 2, and Fig. 7 is a fragmentary sectional view of the truck adjusting feature.

When a vehicle is equipped with pneumatic tires and allowed to stand in one place for a period of time, the tires naturally deteriorate at the spot where they contact with the ground or floor, these spots are also subject to excessive strains, due to the weight of the car, and it is an established fact that the life of pneumatic tires is considerably prolonged where the weight of the vehicle is taken therefrom when it is in the garage, or when it must stand for a period of time. It has heretofore been customary to use an individual jack for each wheel and this entailed considerable labor both to raise as well as lower the vehicle, and it will be obvious that considerable time is expended each time these jacks are applied or removed, for this reason the average public does not generally use the jacks preferring to bear the cost of short tire life rather than perform the labor involved in jacking up the vehicle, and we have therefore perfected a simple and automatic mechanism for raising the entire vehicle which will require neither time nor labor after installation.

Referring now particularly to the drawings in which we have shown the preferred embodiment of our invention, the numerals 1 and 2 indicate a frame which can be constructed of any suitable material, but which we prefer to construct of angle iron, each side comprising two separate pieces, the end of one piece overlapping the end of the other, and the bottom leg of the one member riding on the leg of the other, the upstanding leg of each member having a series of openings 3 therein, so spaced as to be in direct alinement with each other when assembled, small blocks of wood 4 act as spacers between these upstanding legs, a bolt member 5 serving to tightly clamp and hold the members in correct relation to each other, and it will be obvious that these members can be longitudinally adjusted by merely sliding one angle on the other and securing the bolt accordingly.

Inclined front and rear track members 6 are secured to each respective angle, and these members we prefer to make of wood and bolt or otherwise secure a half round strap member 7 to the top face thereof, the end of the strap being bent downwardly and is secured to the bottom leg of the longitudinal angle, the outer ends being bent as shown at 8 to form bumpers for a purpose to be presently described.

Transversely disposed brace members 9 are secured to the frame members 6 and these are further braced at the corners by the straps 10 as shown, it will also be obvious that the members 6 and 7 can be eliminated if desired and the longitudinal members 1 and 2 bent to form the inclined track, but we find the construction as shown to be more economical and satisfactory.

A truck 11 is mounted on this frame and comprises the track engaging wheels 12 mounted on the axles 13 which are in turn journaled in the bearings 14 formed in each bearing member 15 respectively. The member 15 we prefer to make a casting and is provided with suitable openings 16 in the ends thereof adapted to receive one end of the pipes or tubes 17 and 18, the tubes 17 being of a larger diameter and are adapted to receive the pipes 18 therein, so as to form telescoping sections to allow for adjusting the length of the truck to suit vehicles having different wheel bases, transversely disposed openings 19 are formed in these tubes in spaced relation so that they may be set and held in place by means of a bolt or pin 19ª, this adjustment being very similar to the adjustment of the frame proper.

The front pair of bearing members 15 are formed with an upstanding lug 20 which is adapted to be engaged by the front axle of the vehicle, and these are preferably faced with a felt or rubber 21 to prevent the marring of the paint on the vehicle axle.

Rods 22 are loosely connected to the front axle in spaced relation to each other, the ends of the rods projecting through metal blocks 23 which are pivotally mounted on a transversely disposed angle member 24. Coiled spring members 25 are secured to these blocks, the opposite ends being anchored to the longitudinal frame members. The openings in these blocks 23 are slightly larger than the diameter of the rods 22 and the tension of the spring 25 will pull the block backward, the edges of the openings will bite into the rod and prevents its sliding therein, thereby holding the truck in any adjusted position on the inclined trucks. A rod member 26 is also pivoted to the frame directly in the rear of the said blocks, and is looped to form cranks as shown at 27 to accommodate the rods 22 and when it is desired to release the truck from a raised position, these looped portions are swung forwardly and engage the blocks forcing them forwardly and at right angles to the rods as clearly shown in dotted lines in Fig. 4, and allowing the rods to freely slide therein. The center of this rod is also looped as shown at 28, and a link 29 is connected thereto, the opposite end being pivotally connected to the lever 30 by means of the pin 31, this lever is in turn pivotally mounted on the brace 9 by means of the pin 32, and an outwardly extending foot plate 33 is mounted thereon, and it will be obvious that when the plate 33 is forced downwardly as shown in dotted lines in Fig. 4, the member 29 will force the looped crank portions 27 against the blocks 23 and allow the rods 22 to freely slide therein, and it will be understood that the vehicle can be lowered inch by inch if desired, this holding mechanism can also be in the form of a dog and ratchet but we find the above described installation to be economical and satisfactory.

For releasing the vehicle while seated in the driver's seat a number of sheaves 34, 35 and 36 are provided, and these sheaves are anchored to the floor and walls of the garage, a cord 37 is then secured to the foot plate and is trained up and over the respective sheaves, a handle 38 being secured to the end within easy reach of the driver, and a downward pull thereon will rock the foot plate 33 on the pin 32, this releases the rods 22 in the blocks, allowing the truck to roll down the inclined tracks and lower the vehicle to the floor.

The frame of the raising mechanism is sufficiently narrow to allow the vehicle to straddle it, and when the vehicle is driven into the garage the front axle engages the upstanding lug 20 on the truck, and continued forward travel will force the wheels up the inclined track, raising the vehicle clear of the floor, the front axle resting on the front bearings 15, and the rear axle resting on the rear bearings, and as the wheels leave the floor the momentum of the vehicle determines the height that it will be raised from the ground, the upturned track ends 8 serving as a stop and bumper, and should the wheels stop at any position on the inclined track, the truck will be firmly held in that position by the holding mechanism.

The fact that all mechanism is beneath the automobile allows wheels, tires and the like to be freely removed, as well as more space beneath for adjustments when necessary. If desired the frame can also be adjusted in width, but this we do not deem necessary.

From the foregoing description it will be obvious that we have perfected a simple and efficient mechanism for automatically and instantly raising a vehicle clear of the ground or floor.

What we claim is:—

1. A raising mechanism comprising an inclined frame, a wheeled truck mounted thereon, a pair of blocks pivotally mounted on said frame, rods connected to the said truck and extending through the said blocks, and means for rocking said blocks on their pivots to allow the rods to freely slide therein.

2. In a releasing mechanism comprising an adjustable inclined frame, an adjustable wheeled truck mounted thereon, a pair of spring tensioned blocks pivotally mounted on said frame, and rods carried by said truck and extending through and binding in said blocks, and manually operable means for rocking said blocks on their pivots for releasing and allowing said rods to freely slide therein.

In testimony whereof we affix our signatures.

GEORGE L. WUEPPER.
JOHN F. WUEPPER.